Patented Oct. 30, 1945

2,387,751

UNITED STATES PATENT OFFICE 2,387,751

N-ARYLTETRAHYDROQUINOLINES

Joseph B. Dickey, Rochester, N. Y., and James B. Normington, Kingsport, Tenn., assignors to Eastman Kodak Company, Rochester, N. Y., a corporation of New Jersey No Drawing. Application January 21, 1942, Serial No. 427,625

10 Claims. (Cl. 260—288)

This invention relates to N-aminoaryl tetrahydroquinoline, N-alkylaminoaryl tetrahydroquinoline and N-hydroxyaryl tetrahydroquinoline compounds.

The N-aryl tetrahydroquinoline compounds of our invention can be represented by the formula

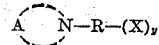

wherein A stands for the non-metallic elements necessary to complete a tetrahydroquinoline nucleus, R represents the residue of a member selected from the group consisting of a benzene nucleus and a naphthalene nucleus, X represents a member selected from the group consisting of an amino group, an alkylamino group and a hydroxy group and $y$ represents a small whole positive number.

While our invention relates broadly to the N-aryl tetrahydroquinoline compounds having the above formula, it relates more particularly to those compounds having the formula:

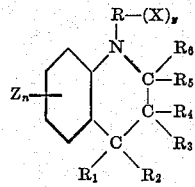

wherein R, X and $y$ have the meaning previously assigned to them, each $R_1$, $R_3$ and $R_5$ stands for a member selected from the group consisting of hydrogen, an alkyl group and a hydroxy group, each $R_2$, $R_4$ and $R_6$ stand for a member selected from the group consisting of hydrogen and an alkyl group, wherein Z represents a hydroxy group, an alkoxy group, an amino group, an alkylamino group, or a halogen atom and $n$ stands for a member selected from the group consisting of zero and a small whole positive number.

It will be understood that when $y$ is 2, for example, X can be both a hydroxy group and an amino group or both a hydroxy group and an alkylamino group, as well as being two hydroxy, two amino or two alkylamino groups. The member Z, when present means that one or more hydrogen atoms of the benzene nucleus indicated is replaced by one or more of the substituents which Z can represent. Similarly, as explained in connection with X, when $n$ is 2, for example, Z can be two of the substituents named or two of the same substituent. In like manner the $R_1$'s can stand for the same or different substituents. Normally, no more than three $R_1$'s will be a substituent other than hydrogen. In general it can be stated that highly substituted compounds are neither necessary nor desirable.

The new N-aryl tetrahydroquinoline compounds of our invention constitute intermediates for the preparation of colored photographic images as well as intermediates for the preparation of azo dye compounds. Further, they can be employed as oxidation inhibitors in general and as gum inhibitors for petroleum products in particular. Also, those compounds in which the N-aryl group is substituted in ortho or para position with the substituents indicated can be used as photographic developers.

When the N-aryl tetrahydroquinoline compounds of our invention are to be used as coupling components in the preparation of azo dyes, they should contain no substituent which prevents their coupling which is believed to take place in the 6-position. Suitable diazonium compounds include those derived from aniline compounds such as p-nitroaniline, o-chloroaniline, 1-amino-2-chloro-4-nitrobenzene and 2-amino-5-nitrophenylsulfonethylamide. The dye compounds thus obtained can be employed to color textile materials such as cellulose acetate, wool and silk.

Similarly, when the N-aryl tetrahydroquinoline compounds contain a free amino group on the N-aryl group they can be diazotized and the diazonium compounds obtained coupled with aniline coupling components such as di-β-hydroxyethyl-m-toluidine, ethyl, β-hydroxyethylaniline and β,γ-dihydroxypropylaniline to obtain dyes which color textile materials such as cellulose acetate, wool and silk. It will be understood that other well known coupling components such as pyrazolone, naphthalene and 1,3-cyclohexadione compounds can be employed to prepare azo dye compounds. Likewise, when the N-aryl tetrahydroquinoline compounds constitute the coupling component diazonium compounds derived from aminonaphthalenes, for example, can also be employed.

The N-aminoaryl tetrahydroquinoline compounds of our invention can be prepared by reducing N-nitroaryl tetrahydroquinoline compounds. The N-alkylaminoaryl tetrahydroquinoline compounds can be prepared by alkylation of the N-aminoaryl tetrahydroquinoline compounds. The N-hydroxyaryl tetrahydroquinoline compounds can be prepared by diazotizing the N-aminoaryl tetrahydroquinoline compounds and decomposing the diazonium compounds formed by warming with water.

The following examples illustrate the preparation of the N-aryl tetrahydroquinoline compounds of our invention.

Example 1

1 gram mole of N-4'-nitrophenyl tetrahydroquinoline is placed in a shaking pressure autoclave together with 10 grams of finely divided nickel (Raney) and 500 cc. of methanol. The nitro group of the tetrahydroquinoline compound is then reduced at 75–120° C. with hydrogen under a pressure of 100 atmospheres. Upon completion of the reduction reaction, the nickel is filtered off and the N-4'-aminophenyl tetrahydroquinoline formed is recovered by evaporation of the reactin mixture under reduced pressure. The compound obtained has the formula:

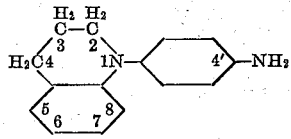

*Example 2*

1 gram of N-4'-aminophenyltetrahydroquinoline is diazotized with sodium nitrite in a dilute hydrochloric acid solution in the usual manner for carrying out diazotization reactions and the resulting diazonium compound formed is decomposed by warming the reaction mixture. The resulting N-4'-hydroxyphenyl tetrahydroquinoline compound is extracted with ether, dissolved in an alcohol water mixture, treated with carbon, filtered and recovered by crystallization. The compound obtained has the formula:

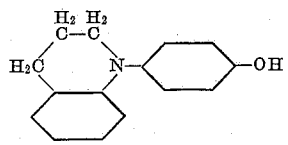

*Example 3*

1 gram mole of N-4'-nitronaphthyl tetrahydroquinoline is placed in a pressure autoclave which can be shaken together with 10 grams of finely divided nickel and 500 cc. of methanol. The nitro group of the tetrahydroquinoline compound is then reduced at 75–120° C. with hydrogen under a pressure of 100 atmospheres. Upon completion of the reduction reaction, the nickel is filtered off and the N-4'-aminonaphthyl tetrahydroquinoline formed is recovered by evaporation. The compound obtained has the formula:

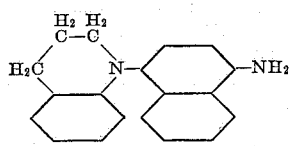

*Example 4*

1 gram mole of tetrahydroquinoline is condensed with 1 gram mole of 1-chloro-2,4-dinitrobenzene to obtain N-2',4'-dinitrophenyl tetrahydroquinoline and this compound is, in turn, reduced with ammonium sulfide to obtain N-2'-amino-4'-nitrophenyl tetrahydroquinoline. N-2'-amino-4'-nitrophenyl tetrahydroquinoline is diazotized and the diazonium compound formed is decomposed by warming to obtain N-2'-hydroxy-4'-nitrophenyl tetrahydroquinoline which compound can, in turn, be reduced by the method described in Example 1 to obtain N-2'-hydroxy-4'-aminophenyl tetrahydroquinoline, the desired compound. The compound obtained has the formula:

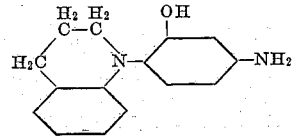

*Example 5*

1 gram mole of N-4'-aminophenyl tetrahydroquinoline is subjected to a methylation reaction to replace a hydrogen atom of the amino group with a methyl radical. The methylation reaction can be effected, for example, with methyl chloride or methyl sulfate. The compound resulting from the methylation treatment has the formula:

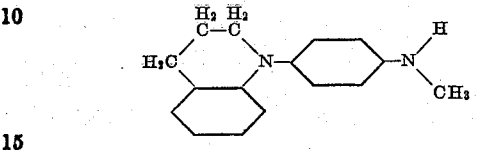

Additional compounds that can be made in accordance with our invention include:

N-3'-hydroxyphenyl tetrahydroquinoline
N-4'-hydroxynaphthyl tetrahydroquinoline
N-2'-methoxy - 4' - aminonaphthyl tetrahydroquinoline
N-2',4'-dihydroxyphenyl-6-dimethylamino tetrahydroquinoline
N-2',4'-dihydroxynaphthyl tetrahydroquinoline
N-2'-methyl-4'-aminophenyl tetrahydroquinoline
N-4'-aminophenyl-2-dimethyl-4-methyl tetrahydroquinoline
N-3'-aminophenyl tetrahydroquinoline
N - 4' - aminophenyl - 5 - methoxy - 8 - chlorotetrahydroquinoline
N-4'-hydroxyphenyl-3-hydroxy tetrahydroquinoline
N-2'-hydroxy - 4' - aminonaphthyl tetrahydroquinoline
N-4',5'-dihydroxynaphthyl tetrahydroquinoline
N-3'-aminonaphthyl tetrahydroquinoline
N-4'-aminonaphthyl-6-hydroxy tetrahydroquinoline
N - 4' - isobutylaminonaphthyl - 6 - isobutylaminotetrahydroquinoline
N - 2',4' - diaminophenyl - 5,8 - dihydroxytetrahydroquinoline
N-3'-hydroxynaphthyl tetrahydroquinoline
N-4'-hydroxyphenyl-8-bromo tetrahydroquinoline
N-4'-ethylaminonaphthyl tetrahydroquinoline
N-2',4'-diaminonaphthyl tetrahydroquinoline
N-2'-amino-4'-methoxy-phenyl tetrahydroquinoline It is to be clearly understood that the examples given are intended to be illustrative and not limitative of our invention as numerous other N-aryl tetrahydroquinoline compounds included within the scope of our invention can be prepared instead of those specifically shown.

The N-nitroaryl tetrahydroquinoline compounds which can be used as the starting materials for preparing the N-aryl tetrahydroquinoline compounds of our invention can be prepared by condensing tetrahydroquinoline compounds unsubstituted in their ring nitrogen atom with nitrochlorobenzene and nitrochloronaphthalene compounds. The preparation of these N-nitroaryltetrahydroquinoline compounds is completely described in our U. S. Letters Patent No. 2,251,922, issued August 12, 1941.

The term "tetrahydroquinoline," as used in the specification and claims, refers to a 1,2,3,4-tetrahydroquinoline.

We claim:
1. The N-aryl tetrahydroquinoline compounds selected from the group consisting of N-aminoaryl tetrahydroquinoline compounds, N-alkyl- aminoaryl tetrahydroquinoline compounds and N-hydroxyaryl tetrahydroquinoline compounds wherein aryl represents a member selected from the group consisting of a benzene nucleus and a naphthalene nucleus.

2. The N-phenyl tetrahydroquinoline compounds selected from the group consisting of N-aminophenyl tetrahydroquinoline compounds, N-alkylaminophenyl tetrahydroquinoline compounds and N-hydroxyphenyl tetrahydroquinoline compounds.

3. The N-naphthalene tetrahydroquinoline compounds selected from the group consisting of N-aminonaphthalene tetrahydroquinoline compounds, N-alkylaminonaphthalene tetrahydroquinoline compounds and N-hydroxynaphthalene tetrahydroquinoline compounds.

4. N-aminoaryl tetrahydroquinoline compounds wherein aryl represents a member selected from the group consisting of a benzene nucleus and a naphthalene nucleus.

5. N-alkylaminoaryl tetrahydroquinoline compounds wherein aryl represents a member selected from the group consisting of a benzene nucleus and a naphthalene nucleus.

6. N-hydroxyaryl tetrahydroquinoline compounds wherein aryl represents a member selected from the group consisting of a benzene nucleus and a naphthalene nucleus.

7. The N-aryl tetrahydroquinoline compounds having the formula

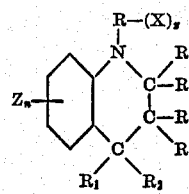

wherein R stands for the residue of a member selected from the group consisting of a benzene nucleus and a naphthalene nucleus, X stands for a member selected from the group consisting of an amino group, an alkylamino group and a hydroxy group, $y$ represents a small whole positive number, $R_1$, $R_3$ and $R_5$ each stands for a member selected from the group consisting of hydrogen, an alkyl group and a hydroxy group, $R_2$, $R_4$ and $R_6$ each stands for a member selected from the group consisting of hydrogen and an alkyl group, Z stands for a member selected from the group consisting of a hydroxy group, an alkoxy group, an amino group, an alkylamino group, and a halogen atom and $n$ stands for a member selected from the group consisting of zero and a small whole positive number.

8. The compound having the formula:

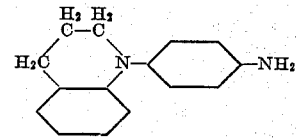

9. The compound having the formula:

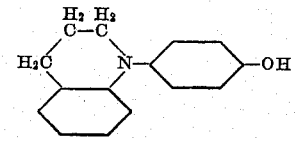

10. The compound having the formula:

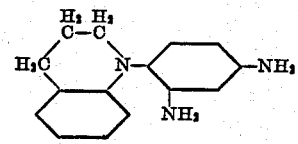

JOSEPH B. DICKEY.
JAMES B. NORMINGTON.